(12) United States Patent
Arkiszewski et al.

(10) Patent No.: US 7,676,201 B2
(45) Date of Patent: Mar. 9, 2010

(54) SELECTABLE SIDEBAND TRANSMISSION

(75) Inventors: Roman Z. Arkiszewski, Oak Ridge, NC (US); Edward E. Campbell, Blandon, PA (US); Gil Ra'anan, Kfar-Vradim (IL)

(73) Assignee: Agere Systems Inc., Allentown, PA (US)

( * ) Notice: Subject to any disclaimer, the term of this patent is extended or adjusted under 35 U.S.C. 154(b) by 1130 days.

(21) Appl. No.: 10/983,888

(22) Filed: Nov. 8, 2004

(65) Prior Publication Data

US 2006/0099916 A1 May 11, 2006

(51) Int. Cl.
*H04B 1/04* (2006.01)
(52) U.S. Cl. .................. 455/114.2; 455/110; 455/118
(58) Field of Classification Search .......... 455/110, 455/111, 112, 113, 118, 109, 91, 104, 114.2, 455/126
See application file for complete search history.

(56) References Cited

U.S. PATENT DOCUMENTS

| | | | |
|---|---|---|---|
| 6,766,148 B1 * | 7/2004 | Mohindra | 455/73 |
| 6,960,962 B2 * | 11/2005 | Peterzell et al. | 331/40 |
| 7,155,178 B2 * | 12/2006 | Chang et al. | 455/101 |
| 7,301,924 B1 * | 11/2007 | Gurbuz et al. | 370/335 |
| 2002/0127992 A1 * | 9/2002 | Fransis | 455/315 |
| 2004/0217753 A1 * | 11/2004 | Yamanaka et al. | 324/76.21 |
| 2005/0266808 A1 * | 12/2005 | Reunamaki et al. | 455/101 |
| 2006/0018247 A1 * | 1/2006 | Driesen et al. | 370/208 |

FOREIGN PATENT DOCUMENTS

| WO | WO 01/71929 A2 | 9/2001 |
|---|---|---|
| WO | WO 02/071635 A1 | 9/2002 |

* cited by examiner

*Primary Examiner*—Edward Urban
*Assistant Examiner*—Christian A Hannon
(74) *Attorney, Agent, or Firm*—Mendelsohn, Drucker, & Assoc., P.C.; Kevin M. Drucker; Steve Mendelsohn

(57) ABSTRACT

The sideband used by a low-intermediate-frequency transmitter for transmitting signals on a channel is selectable. In some embodiments of the invention, the sideband used for transmitting signals is selected based on the location of the channel within a band of channels. In such embodiments, the lower sideband may be selected for transmitting signals if the channel is the lowest-frequency channel in the band, and the upper sideband may be selected for transmitting signals if the channel is the highest-frequency channel in the band. Such sideband selection results in image power falling within the band, which can be helpful in complying with out-of-band power limitations.

19 Claims, 5 Drawing Sheets

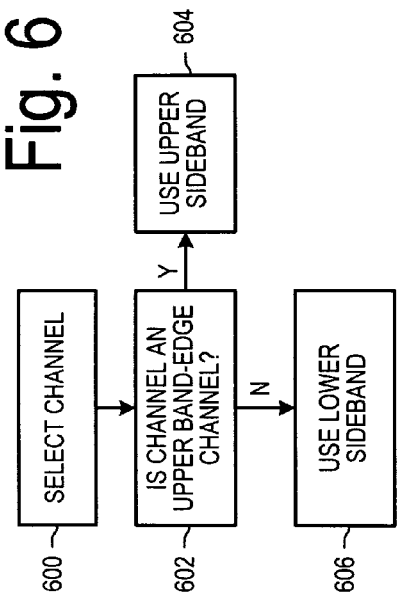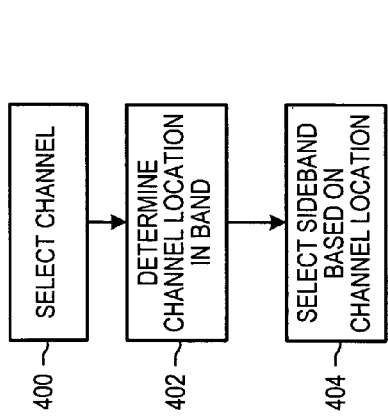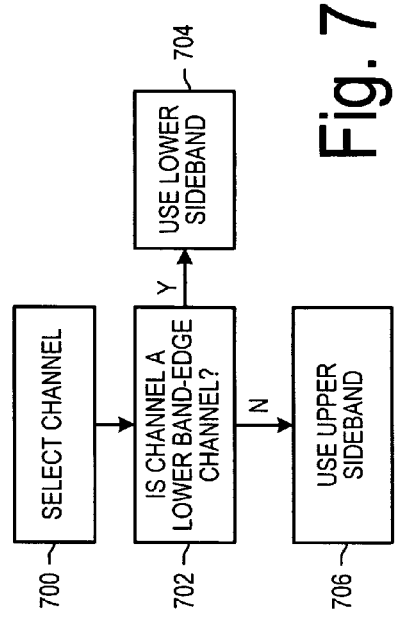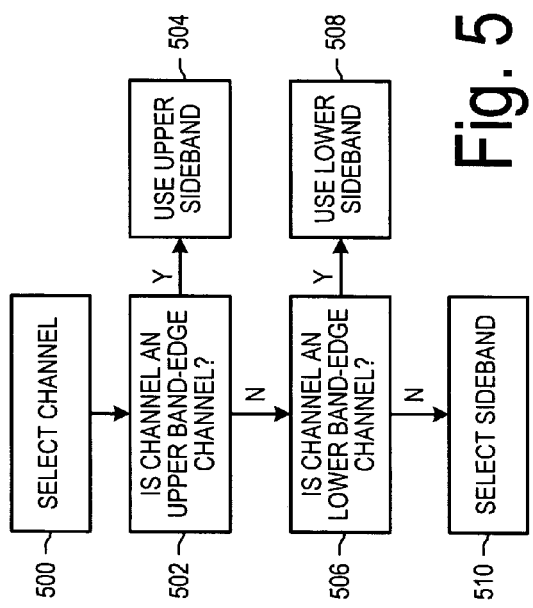

SELECTABLE SIDEBAND TRANSMISSION

BACKGROUND OF THE INVENTION

This invention relates to signal transmission in communication systems in which a transmitter and a receiver communicate over a communication channel using modulated carrier signals. More particularly, this invention relates to control of transmitted power at frequencies outside the channel during such communications. The present invention may be used, for example, in Orthogonal Frequency Division Multiplexing (OFDM)-based wireless local area network (LAN) communication systems.

In a radio communication system, it is often desirable to control the transmitted power, both at frequencies within the channel in which signals are to be transmitted and at frequencies outside the channel. For instance, standards organizations may propose or promulgate communication standards that define channels and set limits on in-channel and out-of-channel transmitted power. An example is the Institute of Electrical and Electronics Engineers (IEEE), which in IEEE 802.11a/b/g/n specifies the physical layer and medium access control for OFDM systems that provide wireless LANs in the Industrial, Scientific, and Medical (ISM) and the Unlicensed National Information Infrastructure (U-NII) frequency bands. As used herein, a "channel" is a predetermined electromagnetic frequency interval available for communication between a transmitter and a receiver, and a "band" is a predetermined electromagnetic frequency interval that contains a plurality of channels having common purposes and common standards and/or regulatory treatment.

Governmental regulatory bodies may also set limits on transmitted power at various frequencies. Such regulatory bodies include the United States Federal Communications Commission (FCC), the European Telecommunications Standards Institute (ETSI), and the Japan Ministry of Public Management, Home Affairs, Posts and Telecommunications (MPHPT).

Various transmitter architectures can be used in systems such as wireless LANs. A transmitter having a superheterodyne architecture can provide high performance, but is generally larger and costlier than one using an alternative architecture. A transmitter having a zero-intermediate-frequency (ZIF) architecture is generally smaller and cheaper than one having a superheterodyne architecture, but generally has worse performance. A transmitter having a low-intermediate-frequency (LIF) architecture, in which the intermediate frequency is less than the modulating frequency or the channel bandwidth, can provide better error vector magnitude and therefore better system performance (lower error rate and/or larger range) than one having a ZIF architecture. However, the finite in-phase/quadrature (I/Q) image rejection in the analog circuit blocks of an LIEF transmitter causes an image in its power spectrum, which can be undesirable.

SUMMARY OF THE INVENTION

The problems in the prior art are addressed in accordance with the principles of the present invention by methods and apparatus in which the sideband used by a LIF transmitter for transmitting signals on a channel is selectable. In some embodiments of the invention, the sideband used for transmitting signals is selected based on the location of the channel within a band of channels. In such embodiments, the lower sideband may be selected for transmitting signals if the channel is one of the lower-frequency channels in the band, and the upper sideband may be selected for transmitting signals if the channel is one of the higher-frequency channels in the band. Such sideband selection results in image power falling within the band, which can be helpful in complying with out-of-band power limitations.

BRIEF DESCRIPTION OF THE DRAWINGS

The foregoing and other aspects, features, and advantages of the present invention will become more fully apparent from the following detailed description, the appended claims, and the accompanying drawings in which:

FIG. 4 is a flow diagram illustrating a method of operating a transmitter in accordance with the present invention.

FIG. 5 is a flow diagram illustrating a specific embodiment of the method of FIG. 4.

FIG. 6 is a flow diagram illustrating another specific embodiment of the method of FIG. 4.

FIG. 7 is a flow diagram illustrating yet another specific embodiment of the method of FIG. 4.

DETAILED DESCRIPTION

Figure 1:
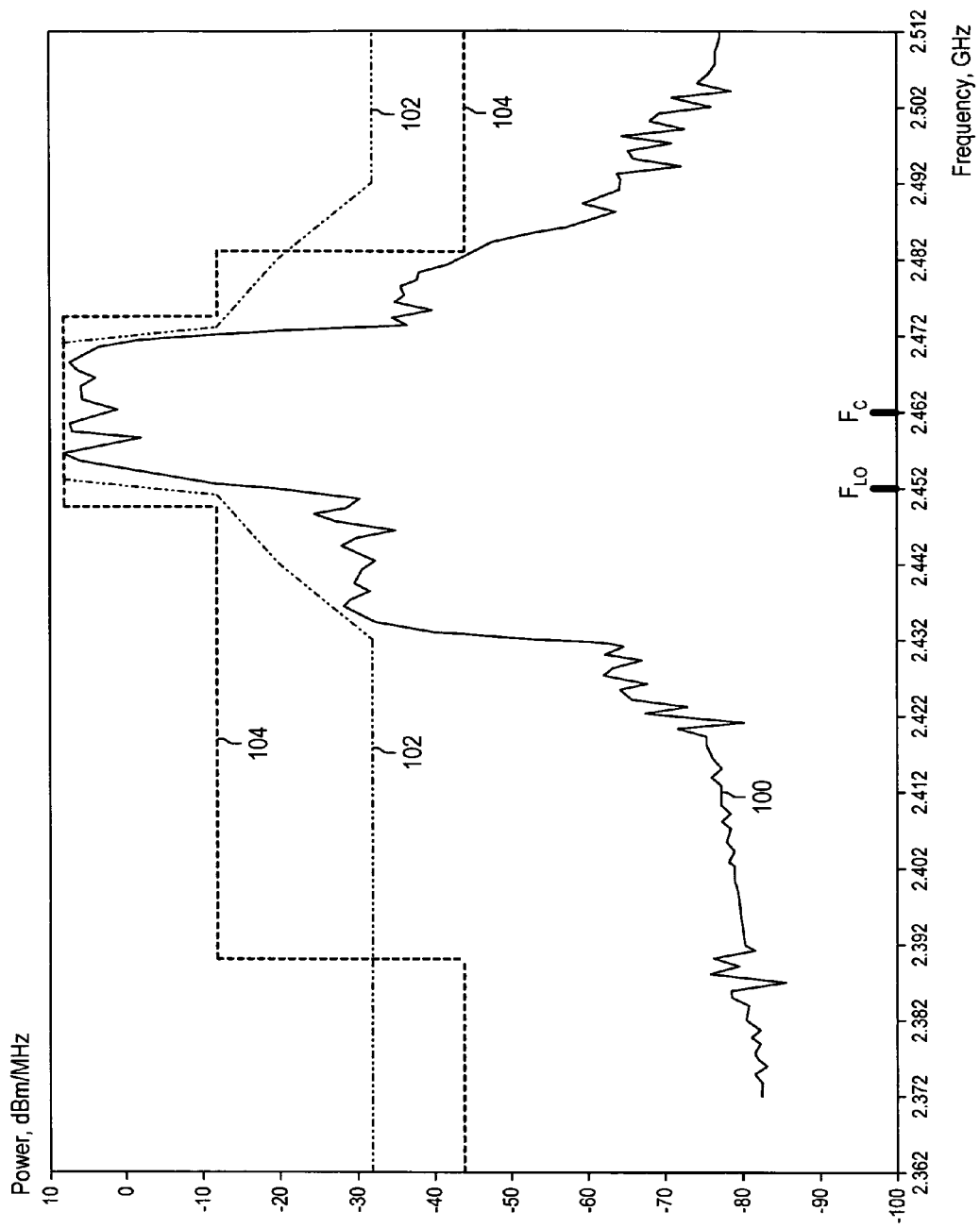
FIG. 1 is a graph showing the power spectrum of an LIF transmitter operating on an upper band-edge channel.

FIG. 1 is a graph showing the power spectrum 100 of an LIF transmitter operating on channel 7 of the 2.4 GHz ISM band, which has a center frequency $F_c$ of 2.462 GHz. Channel 7 is the upper band-edge channel, i.e., the channel in the band having the highest frequency. The transmitter uses an intermediate frequency of 10 MHz, and uses the upper sideband, i.e., the sideband above the local oscillator (LO) frequency $F_{LO}$. Spectral power resulting from finite I/Q rejection of the LIF transmitter appears as an image on the opposite side of the channel center frequency from the local oscillator frequency, and causes the asymmetry of power spectrum 100 in the intervals adjacent the channel. The power spectrum 100 complies with the IEEE 802.11 spectrum mask requirements 102, and complies with the FCC out-of-band spurious emissions limits 104.

Figure 2:
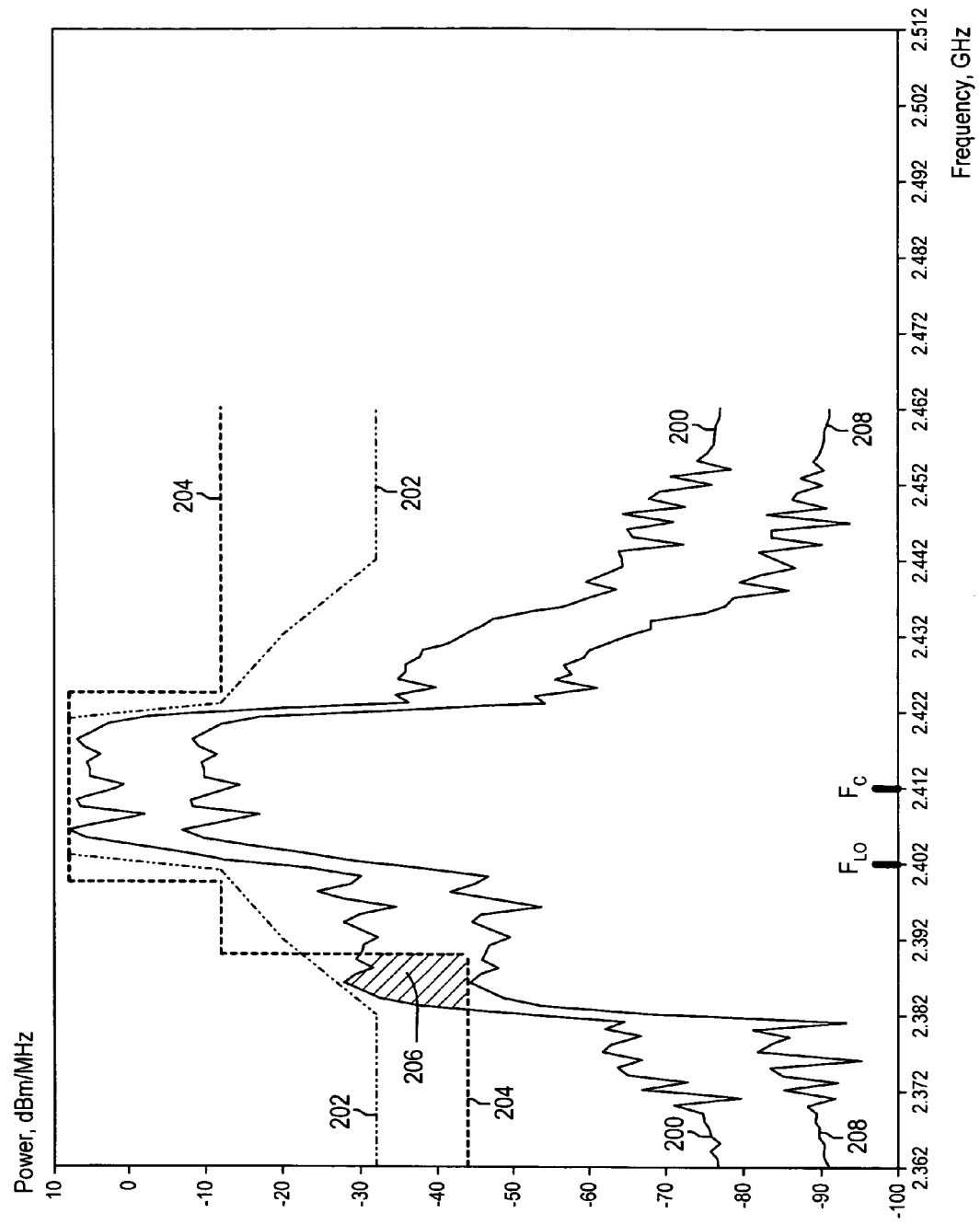
FIG. 2 is a graph showing power spectra of an LIF transmitter operating on a lower band-edge channel.

FIG. 2 is a graph showing power spectra of the above-referenced LIF transmitter operating using the upper sideband on channel I of the 2.4 GHz ISM band, which has a center frequency $F_c$ of 2.412 GHz. Channel I is the lower band-edge channel, i.e., the channel in the band having the lowest frequency. When the in-channel power is the maximum permitted, as illustrated by power spectrum 200, the out-of-channel power complies with the IEEE 802.11 spectrum mask requirements 202. However, the out-of-channel power exceeds the FCC out-of-band spurious emissions limits 204, as can be seen in hatched area 206. One method of dealing with this problem has been to lower the transmitted power sufficiently to comply with out-of-channel power requirements, as illustrated by power spectrum 208. However, reducing in-channel power reduces the range and/or the data rates that can be achieved for transmissions on the channel. Another method of dealing with this problem might be to design an LIF transmitter with sufficient image rejection to comply with out-of-band power limitation requirements, but this is not practical for integrated circuits for use in conventional consumer products and business enterprise wireless LANs.

Figure 3:
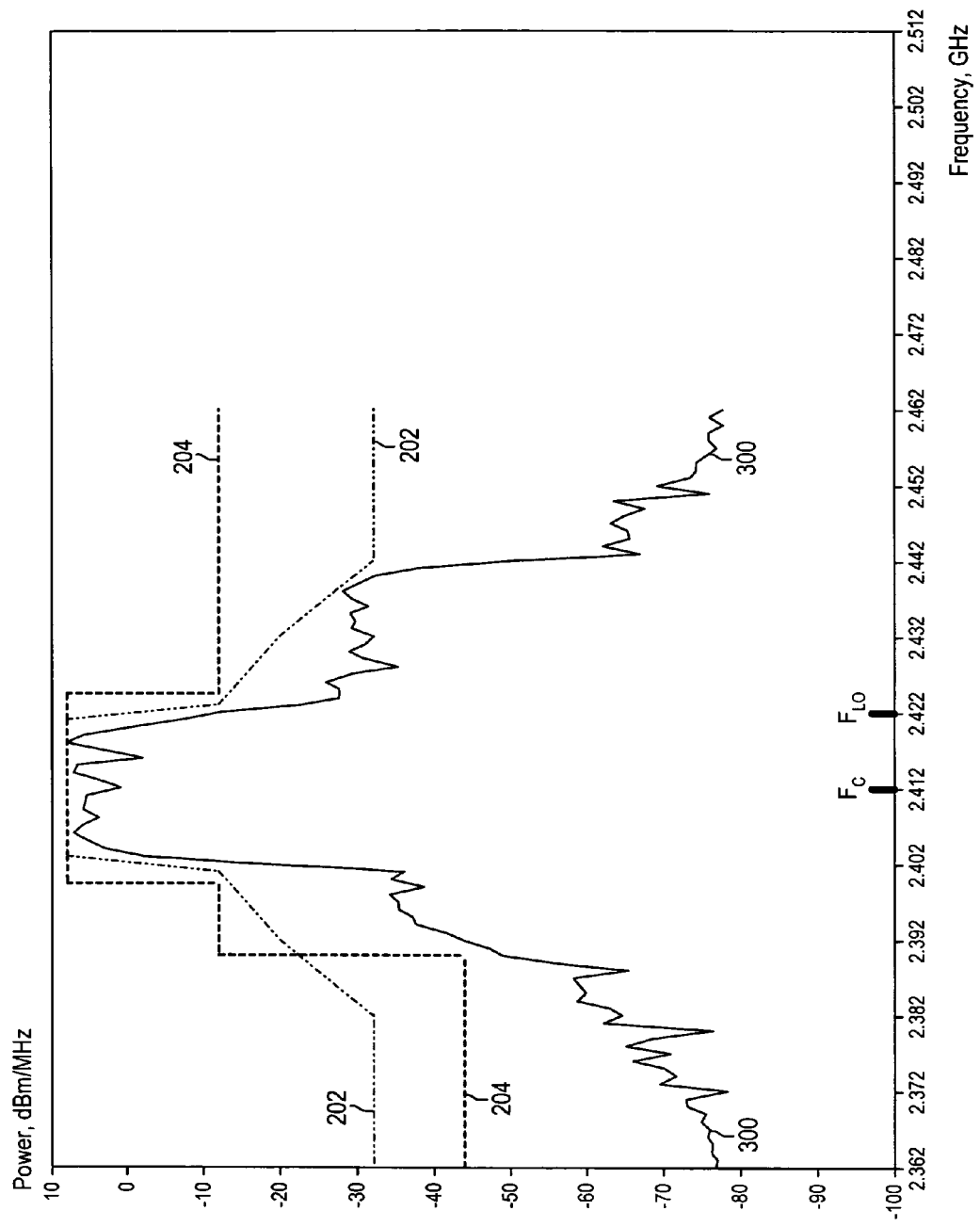
FIG. 3 is a graph showing the power spectrum of another LIF transmitter operating on a lower band-edge channel.

FIG. 3 is a graph showing the power spectrum 300 of an LIF transmitter operating on channel 1 of the 2.4 GHz ISM band, the lower band-edge channel, which has a center frequency of 2.412 GHz. The transmitter uses an intermediate frequency of 10 MHz, and uses the lower sideband, i.e., the sideband below the 2.422 GHz local oscillator frequency $F_{LO}$. Spectral power resulting from finite I/Q rejection of the LIF transmitter appears as an image on the opposite side of the channel center frequency from the local oscillator frequency, and causes the asymmetry of power spectrum 300 in the intervals adjacent the channel. The power spectrum 300 complies with the IEEE 802.11 spectrum mask requirements 202. Because the image falls in-band, power spectrum 300 also complies with the FCC out-of-band spurious emissions limits 204. The use of the lower sideband for the lower band-edge channel enables the transmitter to produce the power spectrum of FIG. 3 that complies with out-of-band power limits, while the use of the upper sideband for the lower band-edge channel causes the transmitter to produce the power spectrum of FIG. 2 that violates out-of-band power limits unless the in-band power is reduced.

FIG. 4 is a flow diagram illustrating a first method of operating a transmitter in accordance with the present invention. In step 400, the channel on which the transmitter will transmit is selected or otherwise determined. In step 402, the location of the selected channel in its band is determined. In step 404, the sideband that the transmitter will use to transmit on the selected channel is selected based on the determined channel location.

FIGS. 5, 6, and 7 are more specific embodiments of the method of FIG. 4, and FIG. 5 is a flow diagram illustrating a second method of operating a transmitter in accordance with the present invention. In step 500, the channel on which the transmitter will transmit is selected or otherwise determined. In step 502, a determination is made as to whether the location of the selected channel is the highest-frequency channel in its band, i.e., whether the selected channel is an upper band-edge channel. If so, in step 504, the upper sideband is selected for transmission on the selected channel. If not, in step 506, a determination is made as to whether the location of the selected channel is the lowest-frequency channel in its band, i.e., whether the selected channel is a lower band-edge channel. If so, in step 508, the lower sideband is selected for transmission on the selected channel. If not, in step 510, the sideband that the transmitter will use to transmit on the selected channel is selected based on other criteria. Such other criteria may be based on the determined channel location; for instance, channels adjacent the band-edge channels may be treated in the same manner as the band-edge channels. Such other criteria may also be based entirely on other design considerations.

FIG. 6 is a flow diagram illustrating a third method of operating a transmitter in accordance with the present invention. The method of FIG. 6 may be advantageous when only the band-edge channels are of concern with respect to image power. In step 600, the channel on which the transmitter will transmit is selected or otherwise determined. In step 602, a determination is made as to whether the location of the selected channel is the highest-frequency channel in its band, i.e., whether the selected channel is an upper band-edge channel. If so, in step 604, the upper sideband is selected for transmission on the selected channel. If not, in step 606, the lower sideband is selected for transmission on the selected channel. Because the sideband used for the intermediate channels in the band does not matter in the premises of this example, they may be assigned to the lower sideband along with the lower band-edge channel.

FIG. 7 is a flow diagram illustrating a fourth method of operating a transmitter in accordance with the present invention. The method of FIG. 7 is analogous to that of FIG. 6, and likewise may be advantageous when only the band-edge channels are of concern with respect to image power. In step 700, the channel on which the transmitter will transmit is selected or otherwise determined. In step 702, a determination is made as to whether the location of the selected channel is the lowest-frequency channel in its band, i.e., whether the selected channel is a lower band-edge channel. If so, in step 704, the lower sideband is selected for transmission on the selected channel. If not, in step 706, the upper sideband is selected for transmission on the selected channel. Because the sideband used for the intermediate channels in the band does not matter in the premises of this example, they may be assigned to the upper sideband along with the upper band-edge channel.

In methods according to the invention, the location of the channel in the band may be determined by comparing information identifying the selected channel with information identifying channel locations within a band. For instance, a look-up table may be created identifying a band-edge channel or channels of a band by channel number, and after a channel is selected or determined in step 400, 500, 600, or 700, the channel number of the selected channel may be compared with the look-up table to determine whether the channel is a band-edge channel.

Figure 8:
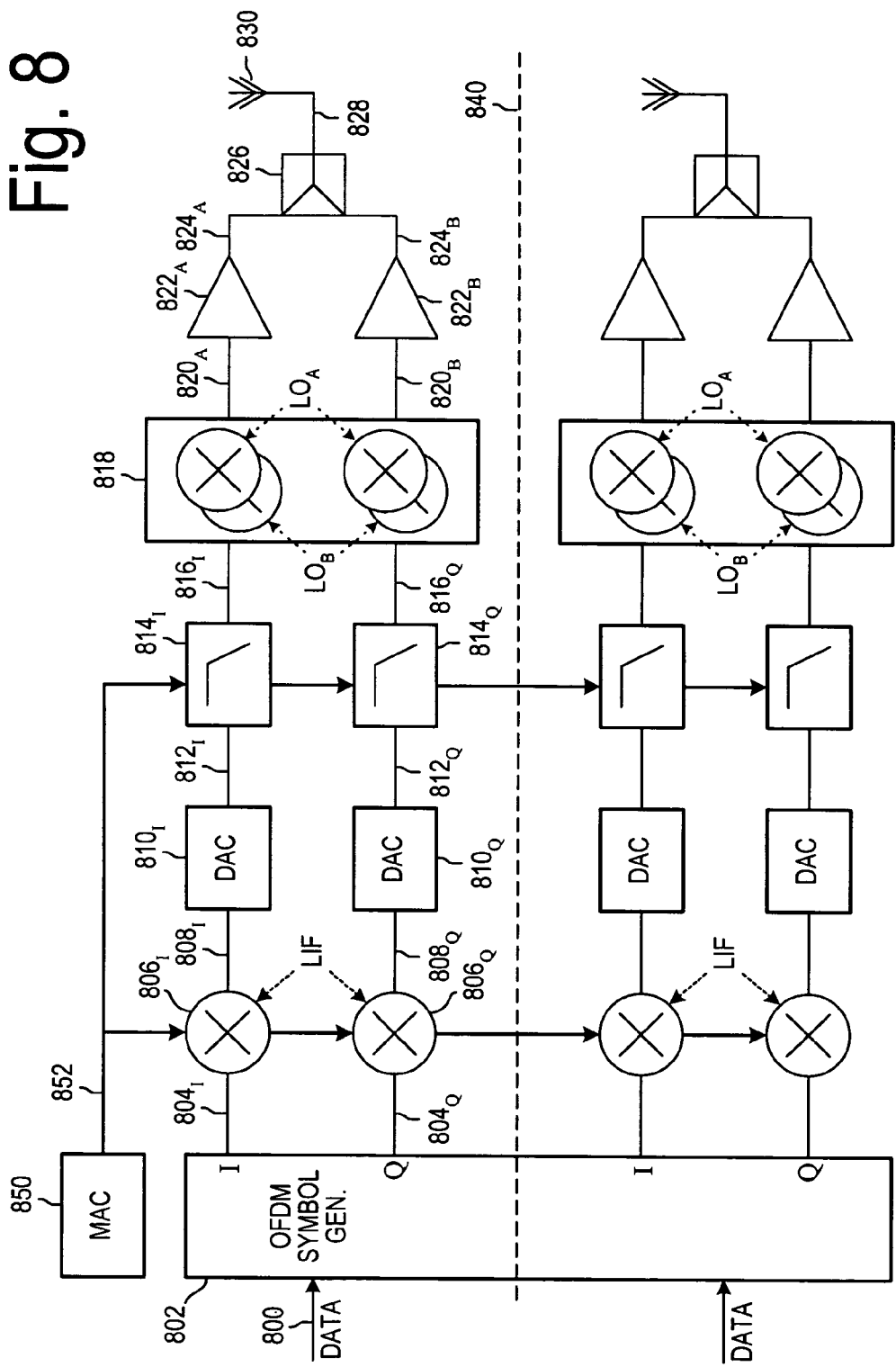
FIG. 8 is a block diagram illustrating an embodiment of a transmitter that is operable in accordance with the present invention.

FIG. 8 is a block diagram illustrating an embodiment of a transmitter that is operable in accordance with the invention. Reference numerals for signals and circuit elements in FIG. 8 bear a suffix I or Q to indicate that they are, or process, in-phase or quadrature signals, respectively; such reference numerals without a suffix refer to such elements collectively. The transmitter illustrated in FIG. 8 is a (2×2) multiple input-multiple output (MIMO) transmitter; accordingly the circuit elements above dotted line 840 are duplicated below it, and the following description is applicable to either signal path. The transmitter illustrated in FIG. 8 is also a multiple-band transmitter, as will be described below. The transmitter illustrated in FIG. 8 may be made IEEE 802.11 compliant.

OFDM symbol generating block 802 receives input data 800 and generates in-phase and quadrature signals $804_I$ and $804_Q$ representing symbols corresponding to input data 800. Block 802 includes functions such as data encoding, inverse fast Fourier transforming, and guard interval insertion to generate symbols 804 corresponding to input data 800. Symbols 804 are mixed with low-intermediate-frequency signals LIF in mixers 806 to generate signals 808 at the low intermediate frequency, which are converted to analog signals by digital-to-analog converters 810 and filtered by filters 814.

In accordance with the invention, the sideband used by the transmitter of FIG. 8 for transmitting signals on a channel is selectable. This is effected by Modem Management Interface (MMI) signals 852 generated by Medium Access Control circuit (MAC) 850, which configure mixers 806 and filters 814 for the LIF up-conversion and channel-filtering processes to generate signals 816 using the desired sideband. MAC 850 may contain a look-up table and execute a comparison algorithm to select a sideband for a channel based on the channel number or other information identifying the channel.

RF conversion block 818 receives the in-phase and quadrature signals $816_I$ and $816_Q$ and mixes them with local oscillator signals to generate modulated RF signals 820 at the RF transmission frequency. Signals 816 are mixed with a local oscillator signal $LO_A$ and summed to generate modulated signals $820_A$ on a channel in a first band, band A. Signals 816 are mixed with a local oscillator signal $LO_B$ and summed to generate modulated signals $820_B$ on a channel in a second band, band B. For instance, band A may be the 2.4 GHz ISM band, and band B may be the 5 GHz U-NII band. Thus, the transmitter illustrated in FIG. 8 is operable as a dual-band transmitter. The modulated RF signals 820 are amplified by amplifiers 822 and coupled to antenna 830 through diplexer 826.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Although the invention has been described with respect to wireless radio communication systems, it will be understood that the invention is applicable to systems that communicate electromagnetically at other frequencies and/or in other media.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A transmitter for transmitting signals on a channel within a band of channels, the transmitter adapted to:
   determine the location of the channel within the band;
   select, based on the determined location of the channel within the band, either a lower sideband or an upper sideband for use in transmitting signals, wherein the lower sideband is selected for transmitting signals if the channel is the lowest-frequency channel in the band, and the upper sideband is selected for transmitting signals if the channel is the highest-frequency channel in the band;
   receive at least two streams of input data;
   process the at least two streams of input data; and
   transmit on the channel, using the selected sideband, signals corresponding to both processed streams of input data, wherein the signals corresponding to the first stream of input data are transmitted over a first antenna, and the signals corresponding to the second stream of input data are transmitted over a second antenna different from the first antenna.

2. The invention of claim 1, wherein the location of the channel within the band is determined using a look-up table.

3. The invention of claim 1, wherein the transmitted signals are modulated using orthogonal frequency division multiplexing.

4. The invention of claim 1, wherein the transmitter is compliant with IEEE 802.11.

5. The invention of claim 1, wherein the transmitter is wireless.

6. The invention of claim 1, wherein the transmitter is a low-intermediate-frequency transmitter.

7. The invention of claim 1, wherein the sideband is selected using a comparison algorithm adapted to:
   determine whether the channel is one of an upper band-edge or a lower band-edge channel; and
   select the sideband based on the determination.

8. The invention of claim 1, wherein the transmitter is a multiple-input, multiple-output (MIMO) transmitter.

9. The invention of claim 1, wherein the transmitter comprises a Medium Access Control circuit adapted to issue a Modem Management Interface write command to configure low-intermediate-frequency up-conversion and channel-filtering circuits for the selected sideband.

10. The invention of claim 9, wherein:
    the transmitter includes at least two signal paths corresponding, respectively, to the at least two streams of input data, and
    the Medium Access Control circuit is adapted to issue Modem Management Interface write commands to configure low-intermediate-frequency up-conversion and channel-filtering circuits in both of the at least two signal paths.

11. The invention of claim 1, wherein each stream of input data comprises in-phase signals and quadrature signals.

12. A method of transmitting signals on a channel within a band of channels comprising:
    determining the location of the channel within the band;
    selecting, based on the determined location of the channel within the band, either a lower sideband or an upper sideband for use in transmitting signals, wherein the lower sideband is selected for transmitting signals if the channel is the lowest-frequency channel in the band, and the upper sideband is selected for transmitting signals if the channel is the highest-frequency channel in the band;
    receiving at least two streams of input data;
    processing the at least two streams of input data; and
    transmitting on the channel, using the selected sideband, signals corresponding to both processed streams of input data, wherein the signals corresponding to the first stream of input data are transmitted over a first antenna, and the signals corresponding to the second stream of input data are transmitted over a second antenna different from the first antenna.

13. The invention of claim 12, wherein the location of the channel within the band is determined using a look-up table.

14. The invention of claim 12, wherein the transmitted signals are modulated using orthogonal frequency division multiplexing.

15. The invention of claim 12, wherein the method is implemented in a transmitter compliant with IEEE 802.11.

16. The invention of claim 12, wherein a Medium Access Control circuit issues a Modem Management Interface write command to configure low-intermediate-frequency up-conversion and channel-filtering circuits for the selected sideband.

17. The invention of claim 12, wherein the sideband is selected using a comparison algorithm adapted to:
    determine whether the channel is one of an upper band-edge or a lower band-edge channel; and
    select the sideband based on the determination.

18. The invention of claim 12, wherein the method is implemented in a multiple-input, multiple-output (MIMO) transmitter.

19. The invention of claim 12, wherein each stream of input data comprises in-phase signals and quadrature signals.

* * * * *